United States Patent Office 3,496,757
Patented Feb. 24, 1970

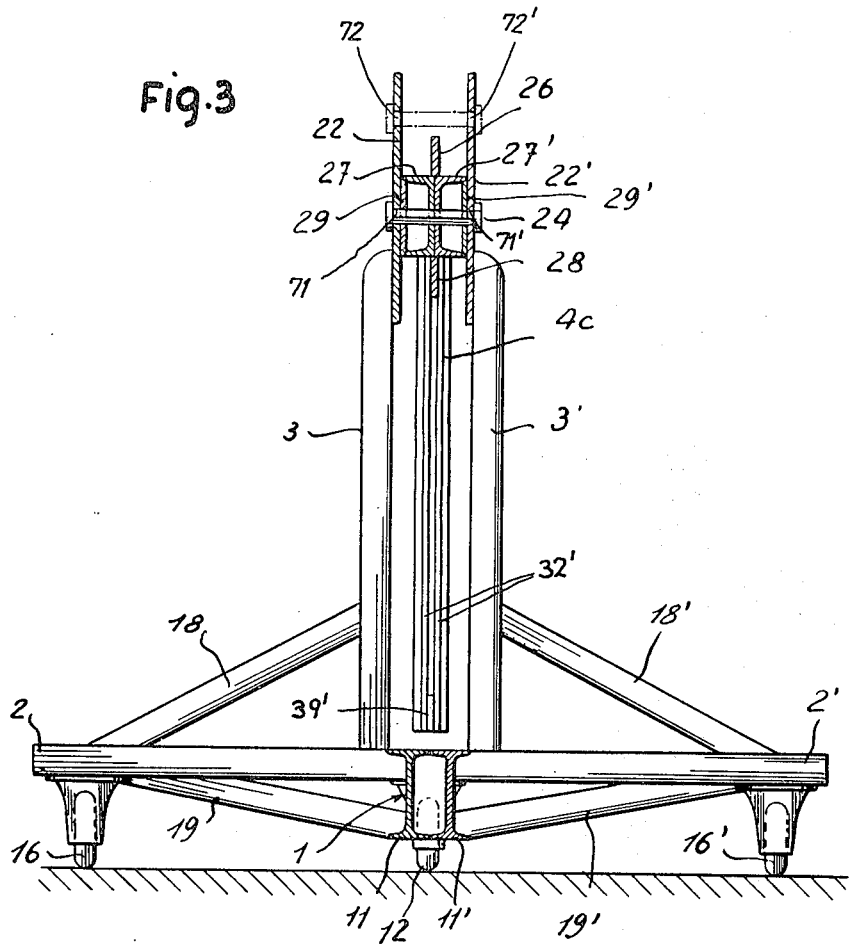
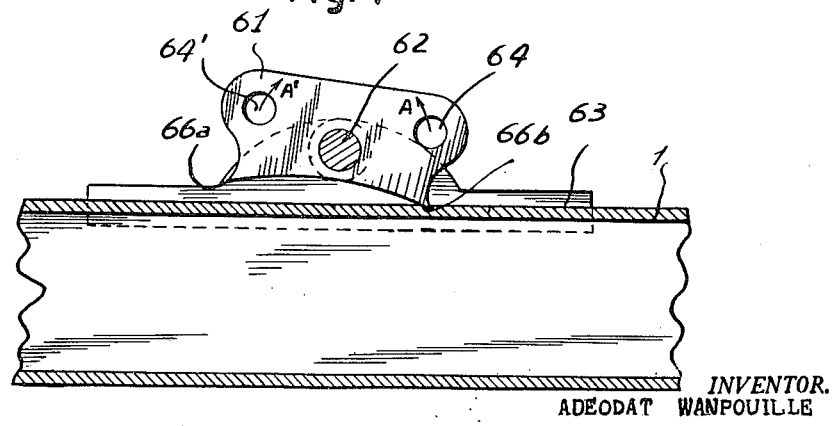

3,496,757
DEVICE FOR HANDLING BULKY STRUCTURES
Adéodat Wanpouille, Levallois-Perret, France, assignor to Wanoda Societe Industrielle de Fourniture d'Outillage et d'Accessoires, Levallois-Perret, France, a corporation of France
Filed Apr. 24, 1967, Ser. No. 633,119
Int. Cl. B21d 1/00
U.S. Cl. 72—446                    10 Claims

ABSTRACT OF THE DISCLOSURE

Device of straightening out, lifting or otherwise handling bulky structures of sheet metal or the like, such as the body or the chassis of an automotive vehicle, wherein a generally T-shaped element is pivotally mounted on an elongated base for swinging in a longitudinal vertical plane under the control of a single-acting hydraulic jack or equivalent power tool which is anchored to one end of the base and can be selectively attached to either the stem or the cross-bar of the "T" for swinging same in one or the other direction; the opposite end of the base carries a preferably adjustable anchorage engageable with the structure to be handled, or with a workbench or other support therefor, while one of the free arms of the "T" acts upon the structure to exert either pressure or traction thereon.

---

My present invention relates to a device for lifting, repairing or otherwise handling bulky structures, particularly (but not exclusively) sheet-metal bodies of automotive vehicles which need to be straightened out after an accident.

The general object of this invention is to provide a versatile, easily manageable and portable device for this purpose which can be used as a means for applying both compression and traction to the body and the chassis of a vehicle or to similar bulky structures.

A more particular object of my invention is to provide a device of this character which utilizes only a simple, single-acting power tool to perform all the operations necessary in the righting and straightening of such structures.

These objects are realized, pursuant to my invention, by the provision of a three-armed element pivotally mounted on an elongated base for swinging in a vertical plane which includes the major dimension of the base; at one end of the base there is mounted an extensible power tool, such as a fluid-operated jack, which can be selectively connected with either of two arms or preferably any of the three arms of the swingable element whereby the latter can be rotated in one or the other direction within its plane even if the power tool is only of the single-acting type. The remaining free arms of the element, or either of them, can then be used to exert traction or pressure upon the structure to be handled, this structure being mounted directly or indirectly on the opposite end of the base with the aid of a suitable, preferably adjustable anchorage.

The swingable element may be generally T-shaped, with two of its arms forming the cross-bar of the "T" while the third arm constitutes its stem. The free end of this stem may have oppositely projecting lugs with holes selectively engageable by a hook, pin or other connector secured to the working end of the power tool, this connector being alternatively insertable into any of several holes provided along the cross-bar. It is also desirable to provide the base with an upright on which the pivot of the swingable element can be selectively located at any of two or more levels. The working arm or arms of the element may be fitted with any attachment adapted to perform a desired operation on the structure being handled by the device, such as grappling hooks, chain blocks, push rods or tow bars.

The anchorage for the structure to be worked on may comprise, according to a further feature of my invention, a carriage slidable longitudinally on the base and fitted with a rocker member having two spurs extending forwardly and rearwardly of its fulcrum. When traction is exerted upon the rocker member in a forward sense (via its rear extremity) or in a rearward sense (via its front extremity), the corresponding spur acts as a brake by bearing upon the top surface of the base which, if desired, may be transversely riffled or otherwise roughened to intensify the braking effect. Anchored to this rocker member, the workpiece may rest on the base either directly or through an intermediate support such as a workbench.

The base, advantageously, consists of a central beam stabilized by a pair of laterally extending outrigger arms, these arms as well as a remote beam extremity being individually supported by respective rollers or casters to give mobility as well as rigidity to the device.

The invention will be described in greater detail with reference to the accompanying drawing in which:

FIG. 3 is a cross-sectional view taken on the line III—III of FIG. 1;

FIG. 4 is a sectional detail view of part of the assembly of FIG. 1, drawn to a larger scale;

Figure 1:
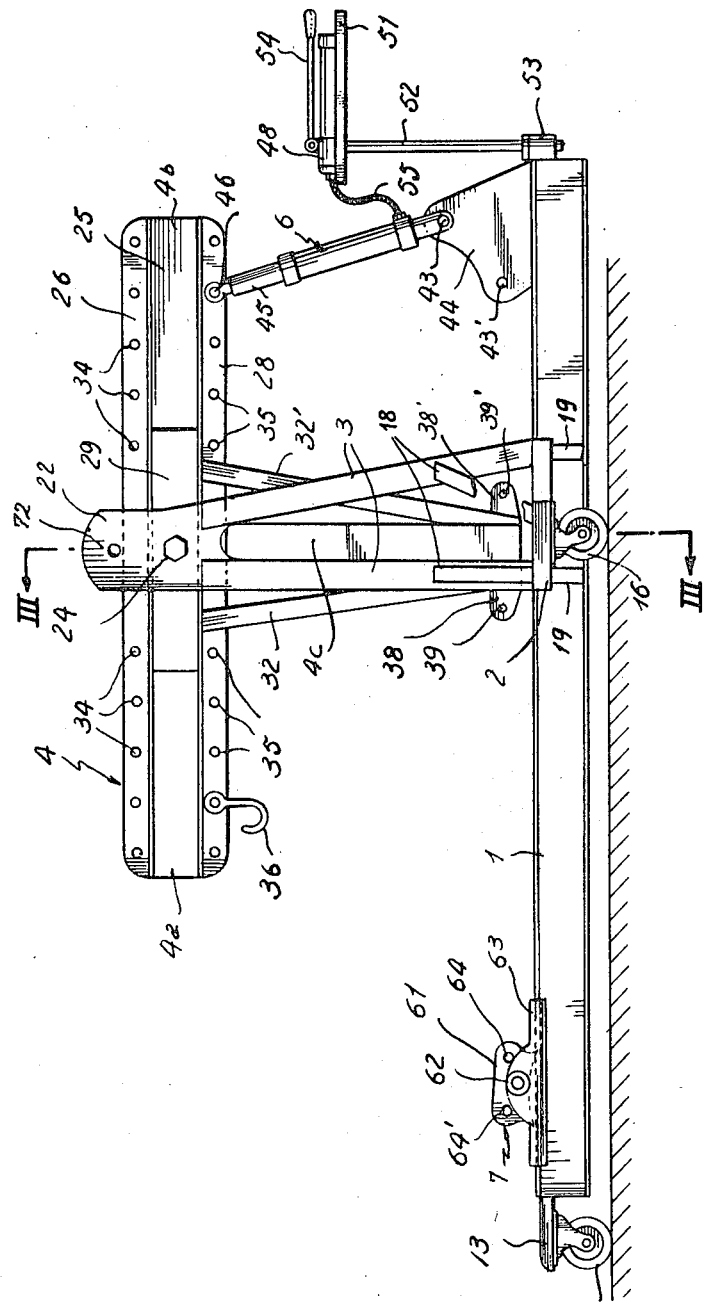
FIG. 1 is a side-elevational view of a device embodying my invention.
Figure 2:
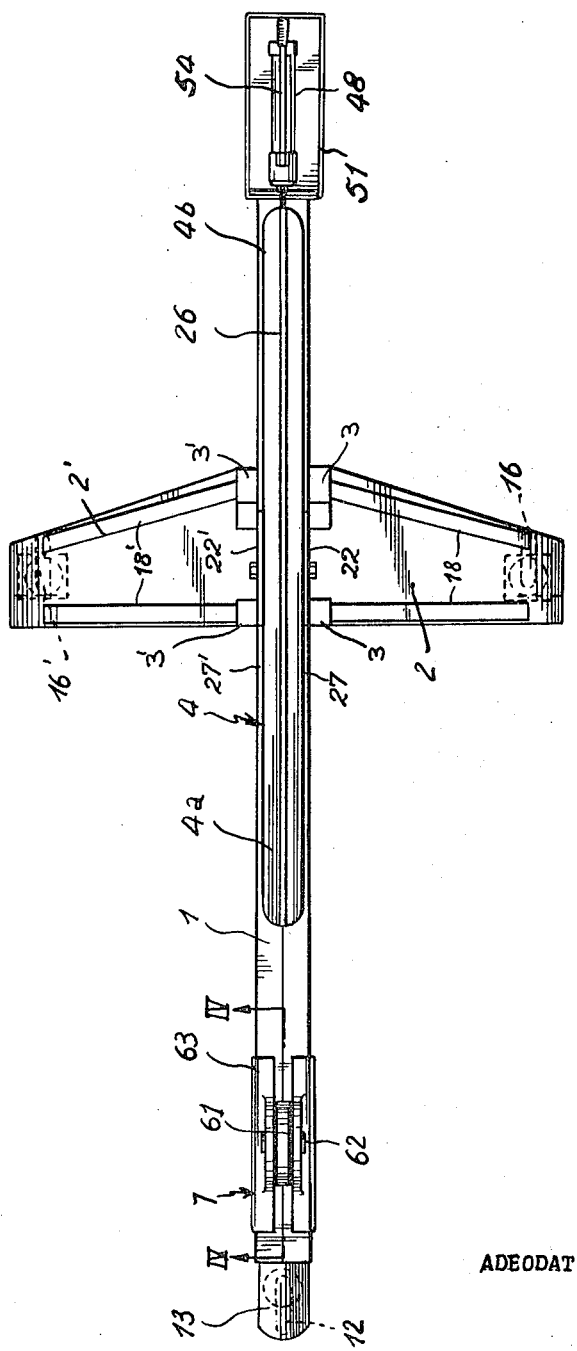
FIG. 2 is a top plan view of the device of FIG. 1.

Reference will first be made to FIGS. 1–3 for a general description of a device embodying my invention.

This device has a base comprising a beam 1 with outrigger arms 2 and 2', the front end of the beam being supported by a roller 12 in a swivel mount 13 while the arms 2 and 2' rest on respective casters 16 and 16'. Beam 1 is shown composed of two parallel I-profiles 11, 11' welded together along their flanges. Two bifurcate uprights 3, 3' rise from arms 2 and 2', respectively, and terminate in a pair of flat vertical plates 22, 22' each with a pair of perforations 71, 72 and 71', 72' forming two alternate seats for a pivot pin 24. This pin, shown in its lower-level position defined by perforations 71 and 71', supports a swingable elements 4 in the shape of a "T" with two aligned arms 4a, 4b (horizontal in FIG. 1) constituting the cross-bar and transverse arm 4c (vertical in FIG. 1) representing the stem of the "T." These three arms are shown to be of substantially the same length. Center arm 4c is flanked by a pair of upwardly diverging stays 32, 32' which help support the arms 4a and 4b, the latter being constituted of a pair of channel sections 27, 27' joined back-to-back and having a pair of co-planar vertical webs 26, 28 welded thereto. The central portions of these channel sections are spanned by two face plates 29, 29' traversed by the pin 24. Pairs of bracing 18, 18' and 19, 19' respectively extend above and below the outrigger arms 2 and 2' to steady the bifurcate upright 3, 3'.

The webs 26 and 28 are formed with upper and lower rows of holes 34 and 35 selectively engageable by a hinge pin 46 at the free end of the ram 45 of a hydraulic jack 6 whose cylinder is pivotally mounted at 43 to a fin 44 rising from the rear end of beam 1. Fin 44 also has an alternate mounting hole 43' for the lower end of jack 6. Operating fluid is supplied to the jack via a flexible conduit 55 from a source of fluid pressure here shown as a hand pump 48 provided with a handle 54; pump 48 rests on a platform 51 which is swivelable on a post 52, journaled in a bearing 53 on the rear of beam 1, so that its handle may always be swung into the most convenient operating position.

A pair of lugs 38, 38' respectively project forwardly and rearwardly from the lower end of arm 4c and have holes 39, 39' to which the ram 45 may also be attached by its hinge pin 46. In the position illustrated in FIG. 1, jack 6 is fastened to one of the lower holes 35 of arm 4b while a working implement in the form of a hook 36 is secured to the opposite arm 4a by a hole of the same set.

The front end of beam 1 carries an anchorage, generally designated 7, for the support of an automotive body or other structure to be worked on. This anchorage comprises a self-locking carriage 63 which straddles the beam 1 for longitudinal motion and to which a rocker member 61 is fulcrumed at 62. Member 61 has a rear hole 64 and a front hole 64' to which the workpiece or a support therefor may be fastened by a hook, chain or the like. This member also carries a forward spur 66a and a rearward spur 66b whose sharp points bite into the upper surface of beam 1 when the carriage 63 is subjected to a forward pull or a rearward pull, respectively, through a link attached to member 61 at hole 64 or 64' as indicated by arrows A and A' in FIG. 4. Thus, carriage 63 may be slid manually along the beam 1 but will be locked in position when stress is exerted thereon by a structure in operative engagement with swingable element 4.

Figure 11:
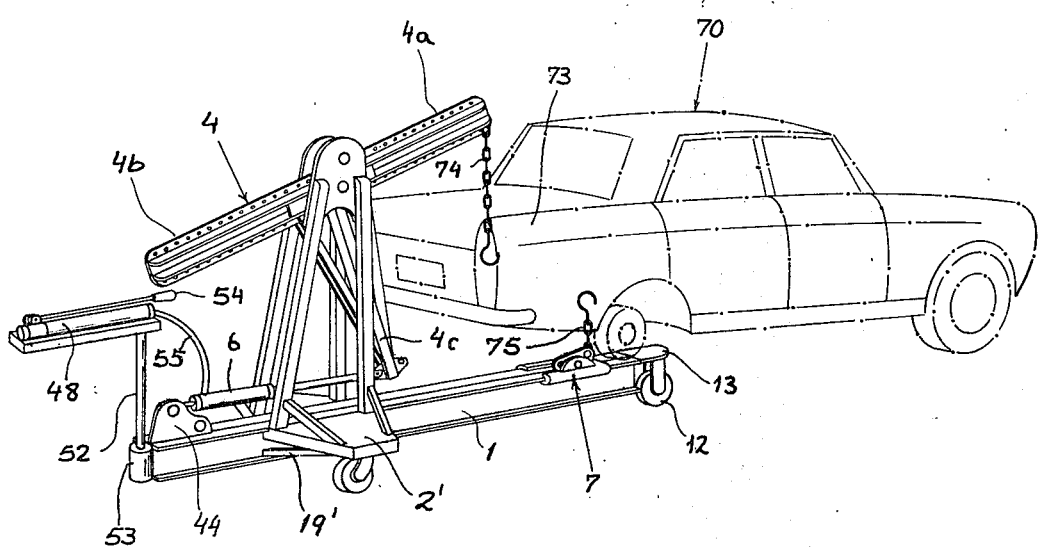
FIG. 11 is a perspective view illustrating the use of the device on the body of an automobile.

As illustrated in FIG. 11, such a structure may be the body of an automobile 70 in the process of having one of its rear panels straightened. The top of panel 73 is shown attached by a chain 74 to arm 4a while the jack 6 exerts pressure on arm 4c to rotate the element 4 counterclockwise as viewed in FIG. 11; the chassis of the vehicle is anchored to rocker assembly 7 by a short chain 75.

Figure 5:
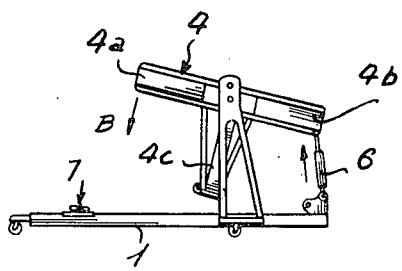
FIGS. 5–10 are side-elevational views similar to FIG. 1 but drawn to a smaller scale and showing my device in different operating positions.
Figure 6:
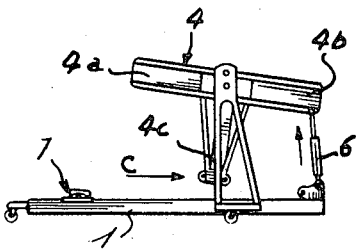
Figure 7:
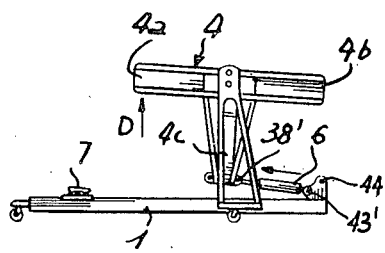
Figure 8:
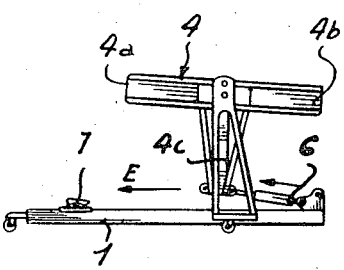
Figure 9:
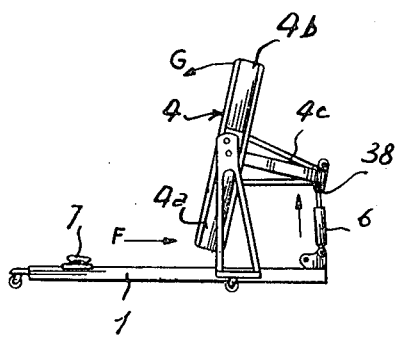
Figure 10:
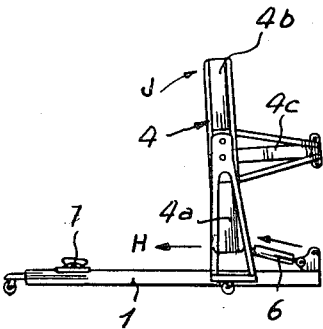

FIGS. 5–10 illustrate the versatility of my device with reference to a few typical operating conditions. In FIG. 5 the jack 6 engages the arm 4b so that arm 4a may exert a generally downward pressure upon an underlying structure (arrow B). In FIG. 6, with the same mode of connection of jack 6, arrow C indicates the possibilty of exerting traction with the aid of depending arm 4c. In FIG. 7 the jack 6, anchored in hole 43' of fin 44, engages the lug 38' of arm 4c so that element 4 is swung clockwise and arm 4a applies upward traction as indicated by arrow D. In FIG. 8, again with the same mode of connection, arm 4c exerts pressure as denoted by arrow E. In FIG. 9, with element 4 rotated through nearly 90° from its normal position, jack 6 is anchored to lug 38 of arm 4c and horizontal traction is produced by arm 4a (arrow F); pressure may be exerted simultaneously or alternatively by arm 4b (arrow G). In FIG. 10, jack 6 is attached to arm 4a which now acts as a pressure member (arrow H) while traction is simultaneously available at arm 4b (arrow J).

It is to be noted that all the aforedescribed operations are performed with the jack 6 acting in one sense only, i.e. with outward thrust of its ram, the reverse motion being accomplished merely under the weight of the ram as the fluid is allowed to return to pump 48. This arrangement has the advantage that the internal cross-section of the cylinder of the jack is fully utilized for the development of fluid pressure which acts only upon the side of the piston remote from the ram; the opposite piston surface, which is partly occupied by the ram, is hydraulically less effective.

The swinging arms of element 4 may be introduced, as required, into the interior of an automotive body through its door openings or through the frames of its windshield or rear window if, as will be the case after some accidents, internal straightening work is necessary.

Naturally, my device can be readily adapted to work other than automobile repair and, without departing from the underlying principles of my invention as defined in the appended claims, may be modified in a variety of ways readily apparent to persons skilled in the art.

I claim:
1. A device for the handling of bulky structures, comprising an elongated base; a generally T-shaped three-armed element pivotally mounted on an intermediate portion of said base for swinging in a vertical plane which includes the major dimension of said base, one of the arms of said element forming the stem and the other two arms forming the cross-bar of the "T"; an extensible power tool having one extremity secured to one end of said base and another extremity provided with fastening means for selectively attaching same to either of two arms of said element to swing the latter in either direction about its pivot; and anchor means on the opposite end of said base engageable with a structure to be worked on by one of the free arms of said element.

2. A device as defined in claim 1 wherein said power tool comprises a single-acting fluid-operated jack.

3. A device as defined in claim 2, further comprising a manually controllable source of operating fluid for said jack connected thereto via a flexible conduit, said base being provided with a swivelable mount for said source.

4. A device as defined in claim 1 wherein said base comprises a beam with a pair of laterally extending outrigger arms and a set of three rollers respectively supporting said outrigger arms and an end of said beam remote therefrom.

5. A device as defined in claim 1 wherein said base is provided with an upright forming a plurality of alternate seats for the pivot of said element at different levels.

6. A device as defined in claim 1 wherein at least one of the arms of said element is provided with a row of holes selectively engageable by said fastening means.

7. A device as defined in claim 1 wherein said anchor means comprises a carriage longitudinally slidable on said base and a rocker member on said carriage with a pivotal axis transverse to said plane and with two spurs disposed forwardly and rearwardly of said axis for braking engagement with the base surface upon respective forward and rearward motion of said carriage under traction exerted upon a respectively opposite extremity of said rocker member.

8. A device as defined in claim 1 wherein all the arms of said element are of substantially the same length.

9. A device as defined in claim 1 wherein the arms forming said cross-bar are provided with rows of holes selectively engageable by said fastening means, the arm forming said stem being provided near its free end with a pair of oppositely extending lugs each having a hole also selectively engageable by said fastening means.

10. A device for the handling of bulky structures, comprising an elongated base; a three-armed element pivotally mounted on an intermediate portion of said base for swinging in a vertical plane which includes the major dimension of said base; an extensible power tool having one extremity secured to one end of said base and another extremity provided with fastening means for selectively attaching same to either of two arms of said element to swing the latter in either direction about its pivot; and anchor means on the opposite end of said base engageable with a structure to be worked on by one of the free arms of said element; said anchor means comprising a carriage longitudinally slidable on said base and a rocker member on said carriage with a pivotal axis transverse to said plane and with two spurs disposed forwardly and rearwardly of said axis for braking engagement with the base surface upon respective forward and rearward motion of said carriage under traction exerted upon a respectively opposite extremity of said rocker member.

References Cited

UNITED STATES PATENTS

| | | | |
|---|---|---|---|
| 2,979,102 | 4/1961 | Ferguson et al. | 72—705 X |
| 2,998,837 | 9/1961 | Luedicke et al. | 72—105 X |
| 3,108,629 | 10/1963 | Jenkins | 73—705 X |
| 3,122,194 | 2/1964 | Bronson et al. | 72—705 X |
| 3,141,493 | 7/1964 | Textor | 72—705 X |
| 3,149,659 | 9/1964 | Bogert | 72—705 X |

MILTON S. MEHR, Primary Examiner

U.S. Cl. X.R.

72—293, 705